United States Patent [19]
Beurer

[11] 3,950,017
[45] Apr. 13, 1976

[54] LEAKPROOF CONNECTION FOR POLYETHYLENE TUBING

[75] Inventor: Robert John Beurer, West Haven, Conn.

[73] Assignee: United Technologies Corporation, Hartford, Conn.

[22] Filed: Apr. 29, 1974

[21] Appl. No.: 465,195

[52] U.S. Cl............. 285/137 R; 285/136; 285/238; 285/297
[51] Int. Cl.² ........................................ F16L 39/04
[58] Field of Search. 285/137 R, 297, 294, DIG. 16, 285/238, 21, 423, 136; 403/268, 269; 264/262

[56] References Cited
UNITED STATES PATENTS

| | | | |
|---|---|---|---|
| 425,071 | 4/1890 | Greene | 403/268 |
| 528,291 | 10/1894 | Cummings | 285/294 X |
| 2,240,537 | 5/1941 | Young | 285/137 R X |
| 3,178,050 | 4/1965 | Doerpinghaus | 285/238 X |
| 3,326,279 | 6/1967 | Eisberg et al. | 285/137 R X |
| 3,402,758 | 9/1968 | Cushman | 264/262 X |
| 3,776,996 | 12/1973 | Cameron et al. | 264/262 X |
| 3,842,389 | 10/1974 | Glover et al. | 285/137 R X |

FOREIGN PATENTS OR APPLICATIONS

| | | | |
|---|---|---|---|
| 1,078,580 | 5/1954 | France | 285/297 |
| 1,902,520 | 8/1970 | Germany | 285/297 |
| 507,685 | 12/1951 | Belgium | 285/238 |
| 1,240,028 | 7/1960 | France | 285/238 |
| 542,316 | 4/1956 | Italy | 285/238 |

Primary Examiner—Thomas F. Callaghan
Attorney, Agent, or Firm—Russell M. Lipes, Jr.

[57] ABSTRACT

The achievement of a leak-free connection between polyethylene tubing and metal tubing by inserting the metal tube into the end of the polyethylene tube which has a plurality of radial holes adjacent its end and casting a polyurethane block about the tube assembly.

2 Claims, 6 Drawing Figures

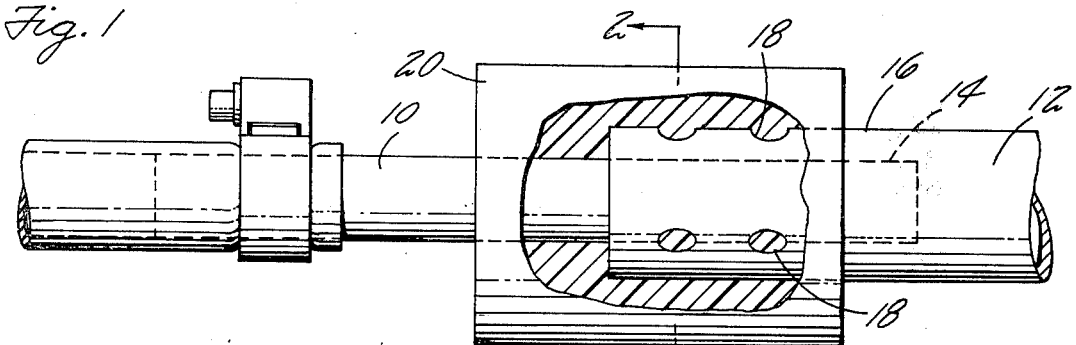
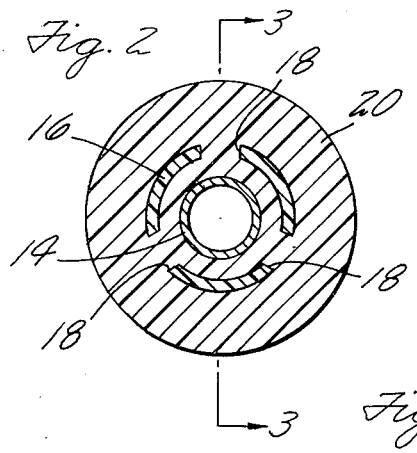
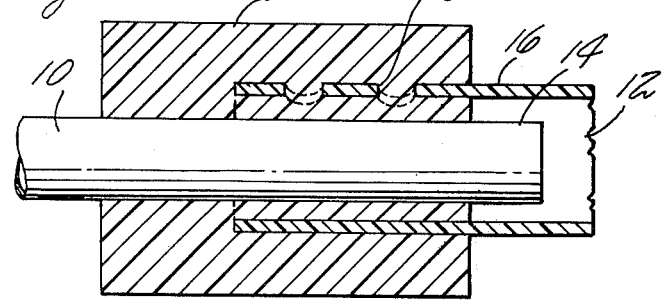
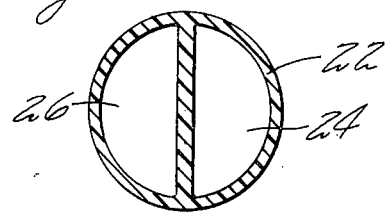
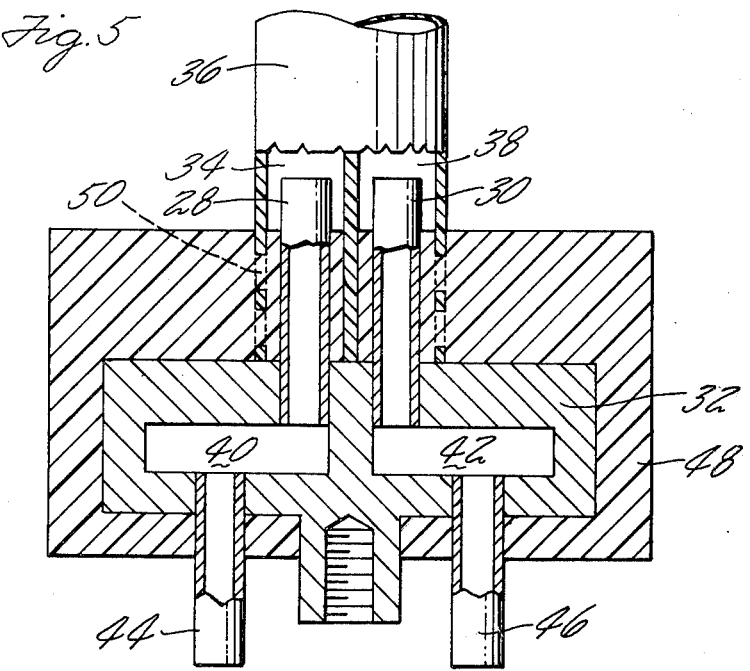

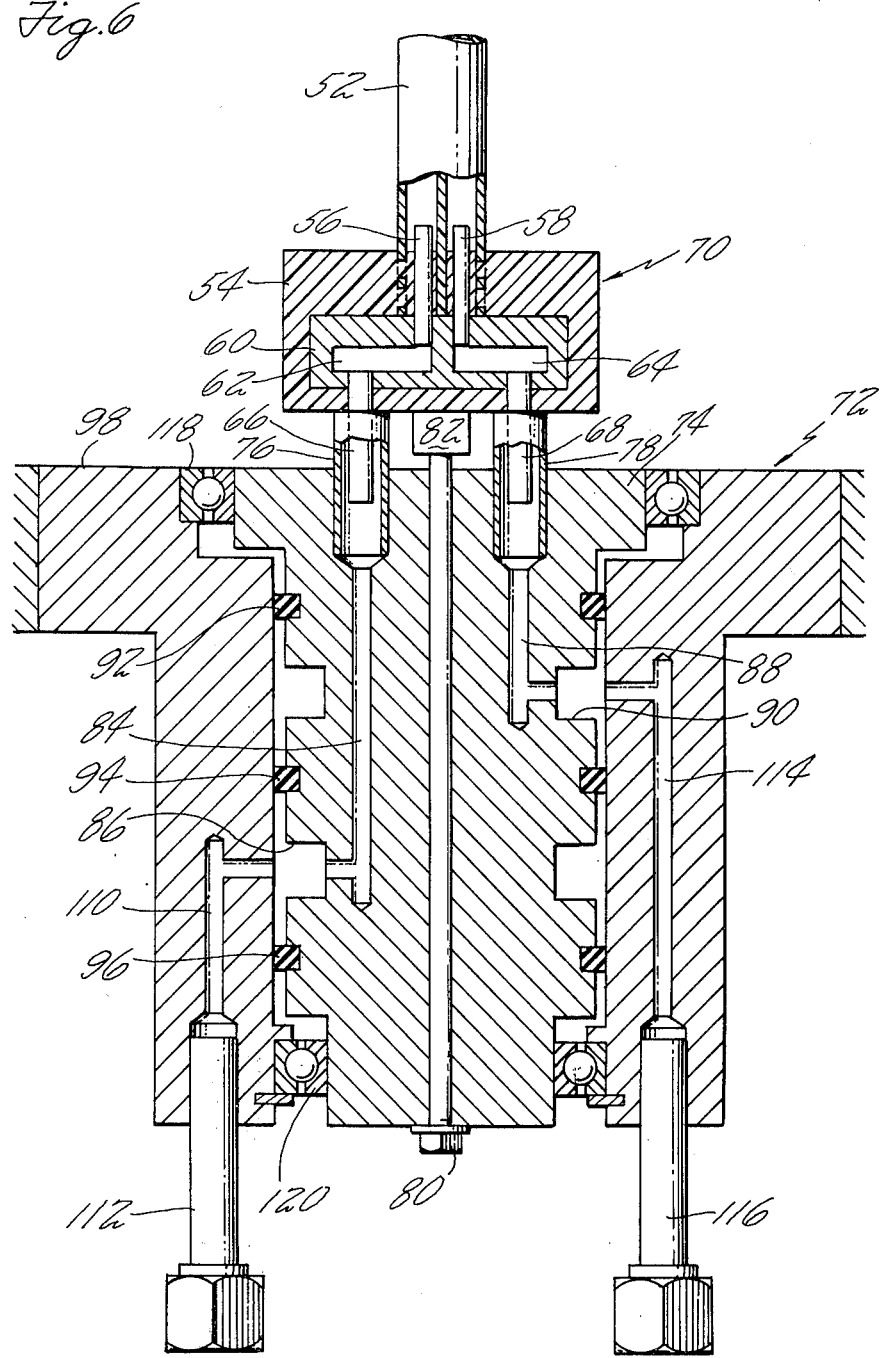

LEAKPROOF CONNECTION FOR POLYETHYLENE TUBING

The invention herein described was made in the course of or under a contract or subcontract thereunder with the U.S. Army Aviation Systems Command.

BACKGROUND OF THE INVENTION

1. Field of the Invention

This invention relates to the joining together of tubing of dissimilar materials in a leakproof connection, and more particularly to the joining of a thermoplastic tube and a metallic tube.

2. Description of the Prior Art

Tubing of both a non-metallic and a metallic material is used as a conduit for gaseous or liquid fluids in aircraft as well as for other purposes. There are various characteristics of these different materials which make any one of them more adaptable or suitable for certain uses. For example, metallic tubing can withstand higher pressures. On the other hand, nonmetallic tubing is more flexible. If it is desired to use both a metallic and a nonmetallic tube, the joining of them together presents problems due to a difference in physical properties. In the instance here involving a fluidic/pneumatic control system for a helicopter cargo hook, polyethylene tubing is used for air conduction since it can be easily fabricated into the desired shape at low cost and weight. However, there are no known bonding agents or sealers that will adhere to polyethylene to provide the leakproof connections required in such a system.

In the prior art, Wolfe U.S. Pat. No. 3,476,408 and Farman U.S. Pat. No. 3,524,661 are directed to the problem of joining metallic pipes to thermoplastic pipes such as those made of polyethylene, Wolfe disclosing bonding means for the connection and Farman disclosing clamping means. Grenell U.S. Pat. No. 2,903,763 is directed to the joining of dissimilar metallic tubing by casting a metallic fitting sleeve around the ends of the tubing. In addition, Wallace U.S. Pat. No. 2,411,398 and Aschinger U.S. Pat. No. 3,033,919 show a molded connection in which material extends through perforations to provide an interlocking structure.

SUMMARY OF THE INVENTION

An object of the present invention is to provide an improved leak-free connection between a thermoplastic tube and a metallic tube.

Another object of the invention is to connect polyethylene tubing and metal tubing in an airtight connection by the use of cast polyurethane.

The foregoing and other objects, features and advantages of the invention become more apparent in the light of the following description of preferred embodiments thereof, as illustrated in the accompanying drawings.

BRIEF DESCRIPTION OF THE DRAWINGS

FIG. 1 shows a polyurethane casting surrounding a junction of a metal tube and a polyethylene tube, in accordance with this invention.

FIG. 2 is a transverse section through the tubing connection along line 2—2 of FIG. 1.

FIG. 3 is a longitudinal section through the tubing section along line 3—3 of FIG. 2.

FIG. 4 is a section through a molded polyethylene tube defining twin passages.

FIG. 5 is a sectional view through a polyurethane casting surrounding the junction of two metal tubes and a twin passage polyethylene tube.

FIG. 6 is a sectional view through a swivelling pneumatic slip ring connector involving the multi-connector of FIG. 5.

DESCRIPTION OF A PREFERRED EMBODIMENT

Referring to FIG. 1, a tubing connection is shown for metal tube 10 and polyethylene tube 12. End 14 of the metal tube is inserted into end 16 of the polyethylene tube which has a plurality of radially extending holes 18. The external diameter of metal tube 10 is slightly smaller than the internal diameter of polyethylene tube 12. A leakproof connection between tubes 10 and 12 is achieved by encapsulating both tubes within a cast polyurethane block 20, the block having portions passing through holes 18 in the polyethylene tube and also a portion filling the annular space between the outer surface of tube 10 and the inner surface of tube 12. This can be seen in FIGS. 2 and 3. The polyurethane which flowed through holes 18 during casting prevents separation of the connection in service.

In systems such as a fluidic/pneumatic cargo hook control system, several fluid passages are needed. Polyethylene tubing is used for air conduction since it can be easily fabricated into the desired shape at a relatively low cost. Such a tubing in multi-section form is shown in FIG. 4. Here, tube 22 has separate passages 24 and 26. This type of divided tubing is shown in FIG. 5 employed in a multi-connector. Metal tubes 28 and 30 are suitably attached to adaptor 32. The upper end of metal tube 28 extends into passage 34 in polyethylene tube 36, and the upper end of metal tube 30 extends into passage 38 in tube 36. The other end of metal tubes 28 and 30 are connected to chambers 40 and 42, respectively, in adaptor 32. Tube 44 is connected to chamber 40 and tube 46 is connected to chamber 42 as part of the control system. Cast polyurethane block 48 encapsulates polyethylene tube 36, metal tubes 28, 30, 44, 46 and adaptor 32 to provide a leakproof connection for the plurality of tubes. The cast polyurethane flows through holes 50 in the circumferential wall of polyethylene tube 36 and surrounds the space between the external surface of each metal tube 28 and 30 and its surrounding polyethylene tube structure, as well as surrounds adaptor 32.

Use of the leak-free connection of this invention for transmitting air pressure from a rotating mechanism to a non-rotating member in a fluidically controlled system is shown in FIG. 6. Multi-section polyethylene tube 52 is connected by cast polyurethane block 54 to metal tubes 56 and 58. The block also surrounds adaptor 60 defining chamber 62 to which metal tube 56 is connected and chamber 64 to which metal tube 58 is connected. Tube 66 is connected to chamber 62 and tube 68 is connected to chamber 64 to provide connections for leakproof multi-connector 70 to swivelling slip ring assembly 72. Rotor 74 of the slip ring assembly has metal tubes 76 and 78 which project therefrom and receive tubes 66 and 68, respectively, of the multi-connector. The rotor is sealed against the multi-connector by the tightening action of bolt 80 which extends through the center of the rotor and is threaded into socket 82 on the multi connector. This action pulls the pliable surface of cast polyurethane block 54 against protruding tubes 76 and 78. Input fluid pressure is transmitted through metal tube 56, chamber 62, and tubes 66 and 76 to passage 84 and annular groove 86 in rotor 74, and also through metal tube 58, chamber 64, and tubes 68 and 78 to passage 88 and annular groove 90 in the rotor. Seals 92, 94 and 96 on each side of the annular grooves prevent fluid leakage. Pressure fluid is directed into stator 98 from annular groove 86 through passage 110 to tubing connection 112, and from annular groove 90 through passage 114 to tubing connection 116. Swivelling capability of rotor 74 and multiconnector 70 with respect to stator 98 is provided by bearings 118 and 120 at each end.

Although the invention has been shown and described with respect to preferred embodiments thereof, it should be understood by those skilled in the art that the foregoing and other changes and omissions in the form and detail thereof may be made therein without departing from the spirit and scope of the invention, which is to be limited and defined only as set forth in the following claims.

I claim:

1. A leakproof connection between polyethylene tubing and metal tubing including;
   a polyethylene tube defining a plurality of walled passages;
   a metal tube for each of said passages;
   each metal tube having an end received within an end of each passage and spaced from the passage wall;
   at least one radially extending hole in the wall of each passage;
   each of said metal tubes being attached to adaptor means providing individual connections;
   and cast polyurethane means sufficiently surrounding said polyethylene tube, metal tubes and adaptor to provide a leakproof connection;
   said polyurethane means extending through said radially extending holes and filling the spacing between each metal tube and its surrounding passage wall.

2. A leakproof connection between polyethylene tubing and metal tubing including;
   a polyethylene tube defining a plurality of walled passages;
   a first metal tube for each of said passages;
   each metal tube having an end received within an end of each passage and spaced from the passage wall;
   at least one radially extending hole in the wall of each passage;
   each of said metal tubes being attached to adaptor means and providing communication with individual chambers within said adaptor;
   second tubes providing an exterior connection for each of said chambers;
   cast polyurethane means sufficiently surrounding said polyethylene tube, first metal tubes and adaptor to provide a leakproof connection between said polyethylene tube passages and said first metal tubes;
   said polyurethane means extending through said radially extending holes and filling the spacing between each first metal tube and its surrounding passage wall;
   passage defining means having tubular projections therefrom for connection with each of said second tubes;
   and means for attaching said passage defining means to said adaptor so that said tubular projections can be drawn against said cast polyurethane means to provide a leakproof connection.

* * * * *